March 12, 1940. W. L. MORRISON 2,192,928
AUTOMOBILE DOOR
Original Filed Aug. 31, 1932 2 Sheets-Sheet 1
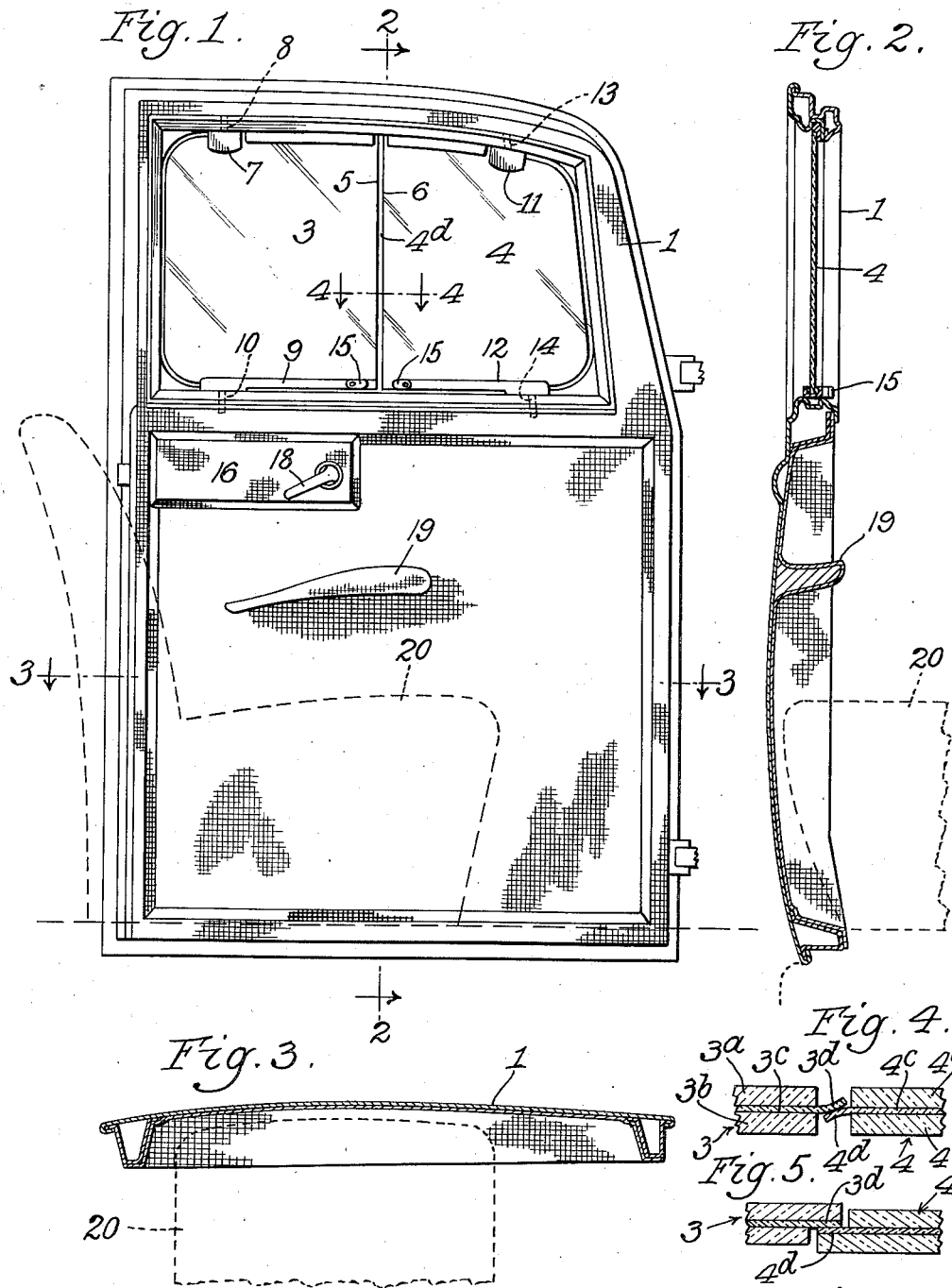
Inventor
Willard L. Morrison
by Parker & Carter
Attorneys.

March 12, 1940. W. L. MORRISON 2,192,928
AUTOMOBILE DOOR
Original Filed Aug. 31, 1932 2 Sheets-Sheet 2
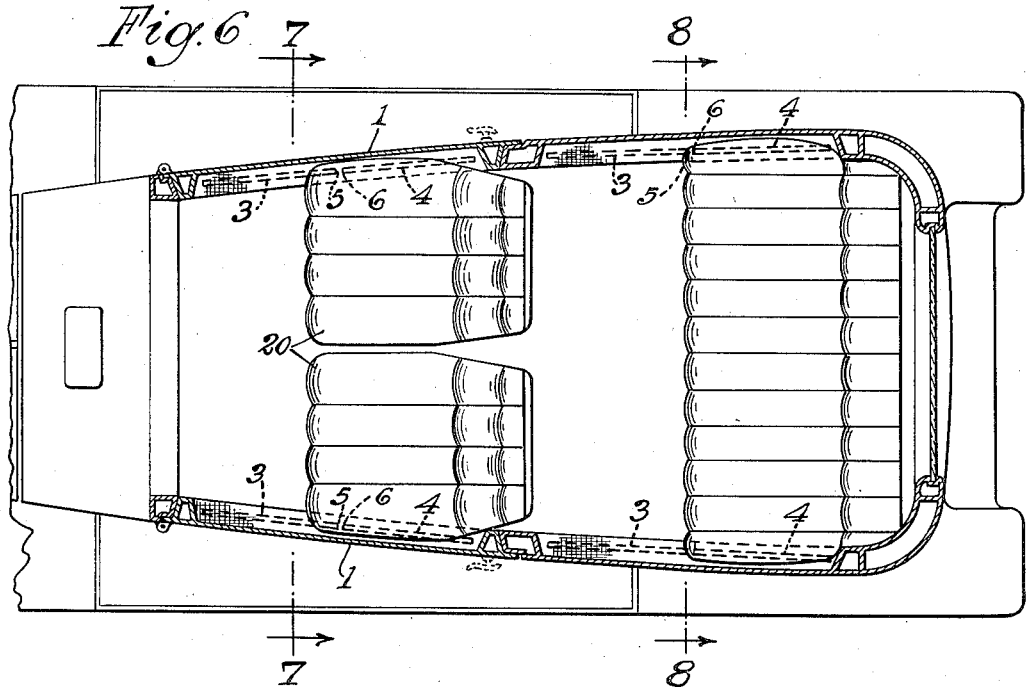
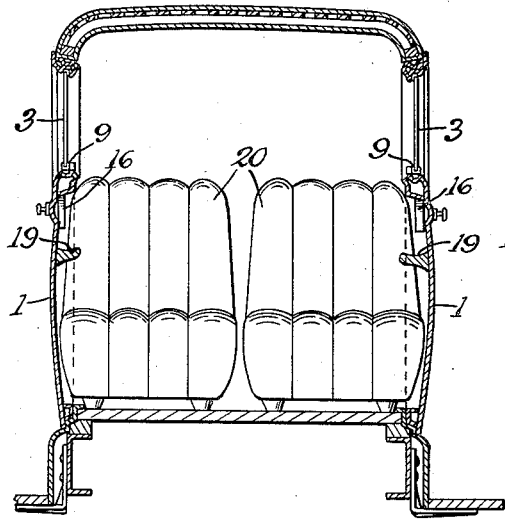
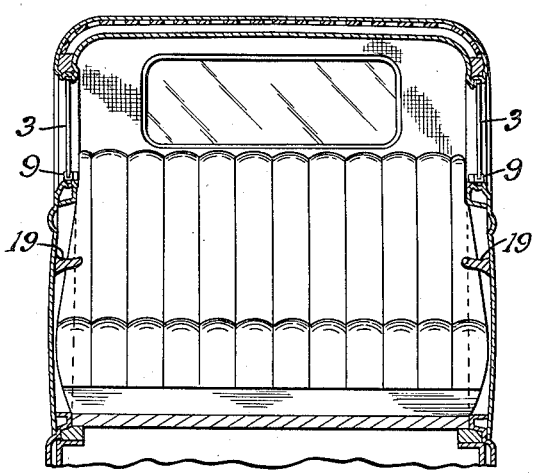
Inventor
Willard L. Morrison
by Parker & Carter
Attorneys.

Patented Mar. 12, 1940

2,192,928

UNITED STATES PATENT OFFICE 2,192,928

AUTOMOBILE DOOR

Willard L. Morrison, Lake Forest, Ill.

Original application August 31, 1932, Serial No. 631,135. Divided and this application May 18, 1934, Serial No. 726,344

7 Claims. (Cl. 296—44)

This invention relates to improvements in automobile doors and has for its object to provide a new and improved device of this description. The invention has as a further object to provide an automobile door which shall be free from pockets for the windows and which shall, therefore, give more room crosswise of the automobile, and which shall at the same time cheapen the construction cost of the automobile. The invention has as a further object to provide an automobile door having ordinary sealed windows which may also be used as an air deflector or an air scooper and which can be moved when desired to provide a substantially complete open window without the use of a pocket or a receptacle in the door as is now necessary for the ordinary window. The invention has other objects which are more particularly pointed out in the accompanying description.

Referring now to the drawings,

Fig. 1 is an inside view of a door embodying the invention, showing the seat in dotted lines;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a view showing a modified construction;

Fig. 6 is a view showing a cross section through an automobile embodying the invention;

Fig. 7 is a sectional view taken on line 7—7 of Fig. 6;

Fig. 8 is a sectional view taken on line 8—8 of Fig. 6.

Like numerals refer to like parts throughout the several figures. This case is a division of my application, Serial No. 631,135, filed August 31, 1932 issued as Patent No. 1,962,965 on June 12, 1934.

As illustrated in the drawings, I have shown an automobile door 1, the inner face of the door being shown in Fig. 1. Two glasses 3 and 4 are located in the window space of the door and have their edges 5 and 6 abutting, forming the window of the door. These glasses are pivotally connected to the upper and lower sections of the frame bounding the window opening.

At the top of the glass 3 is a supporting member 7 which has a pin or the like 8 extending into the frame so as to act as a pivot. At the bottom of the glass is another supporting member 9 which has a pin 10 which extends into the frame. The pins 10 and 8 act as pivots so that the glass may be moved out to any desired angular position. The glass 4 has similar supporting members 11 and 12 and similar pins 13 and 14 which act as pivots. The supports for the glass are preferably near the ends of the glass farthest from their meeting edges.

The glasses 3 and 4 are preferably made in separate sheets $3a$ and $3b$ and $4a$ and $4b$ and between these sheets are sheets of transparent flexible material $3c$ and $4c$, preferably a Celluloid material or some similar material is used which is not brittle or friable. The sheets of material $3c$ and $4c$ have their edges $3d$ and $4d$ projecting from the edges of the glass, as shown in Fig. 4. When the glasses 3 and 4 are then brought together so that their edges abut, these edges $3d$ and $4d$ meet, as shown in Fig. 4, to form a water tight joint. It is therefore unnecessary to have the ordinary window, and it is also unnecessary to have any pocket below the window for the reception of anything connected with the window. This space is therefore left free so as to increase the width of the car. The space in each door may be three or four inches, thus increasing the width of the car six to eight inches, in addition to decreasing the expense of making the pocket or the second or inner wall of the pocket, the door requiring only one wall and that the outer wall.

Instead of having the edges of the non-brittle material projecting, as shown in Fig. 4, I may make one of the glass sections of each glass wider than the other so that one glass section overlaps the other, and intermediate them make the parts $3d$ and $4d$ simply flush with the end of the sections which overlap so that these parts come into contact, as shown in Fig. 5, so as to make a water tight joint. The other edges of the glasses have water tight joints made in any suitable manner, as by means of the ordinary rubber gaskets or the like.

The glasses may have the locking pieces 15 so that when they are in their closed positions, pivoted parts may be moved down so as to be at right angles to the position shown in Fig. 1, locking the parts against outward movement. The inward movement is prevented by the window frame itself. The lock 16 for the bolt 17 of the door is properly encased as shown and is provided with the controlling handle 18 in the usual manner. It will be seen that this construction leaves practically all of the space below the window free.

If desired, I may place on the outer wall of the door and projecting inwardly, an arm rest which will be in a low position and a comfortable position for the arm of the rider seated in the seat.

I have shown in dotted lines the seat 20 in position and the ends project into the recess in the door, as shown in Figs. 2 and 3, thereby taking the extra space secured crosswise of the car by means of this invention.

In Figures 6, 7 and 8 I have shown the seats with both ends projecting into the recesses in the bottom of the doors. As shown in these figures, substantially the entire bottom of the doors are recessed, the recesses opening into the interior of the automobile body when the doors are closed, the ends of the seats projecting into these recesses, the recesses being unobstructed by any window or window mechanism. It will be noted, as seen in Figs. 6 and 8, that there is a portion of the body under the rear windows made up of the outer wall so as to have the recess, and that there is also an arm rest in this recess, the outer wall and the arm rest providing a recess above the arm rest into which the elbow of the rider may be received. It will be further noted that a portion of the body of the rider may be received in the recesses at the sides of the seat so as to give more room and more comfort due to the widening of the interior of the automobile by this construction. I prefer to place the upholstery or finish of the automobile on the inner face of this outer wall so that a proper finish may be provided. This upholstery also acts as a dampener to prevent noise such as drumming.

As before stated, in addition to getting the extra space, the construction is reduced in cost from eight to ten dollars per car, which is of vital interest in view of the high competition at present. While I am enabled to increase the width of the inside of the car, I do this, as will be seen, without increasing the outside width, getting the extra space for the increase of inside width from the recess in the door itself. By moving the glasses at right angles to the position shown in Fig. 1, a full open window is secured.

It will be noted that in this construction the seal between the two sections of the glass 3 and 4 is made by relatively moving these two sections, and that the seal between them is broken or disengaged also by a relative movement of the two sections. When this relative movement brings the two sections towards each other, the seal is made between the parts 3d and 4d, and when the relative movement moves the two sections away from each other, the seal is broken.

It will be noted that the door below the window has only a single wall, which is an outer wall, the trim or upholstery attached to this wall. It will further be noted that with this construction the door is recessed below the window and this increases the inside width of the car so that the riders have more width crosswise of the car. I have shown a part of the seat as projecting into this recess, but this width can be used without this, as the rider may simply move over toward the door so that a part of his body is received into this recess or space. It will further be noted that I am able to provide this extra width and this space or recess and still have windows which can be opened for ventilating purposes, due to the fact that the glass pieces 3 and 4 are pivotally connected in the window opening. The front glass piece is pivoted near the front and the rear glass piece near the rear so that they may be moved out to proper angles to secure ventilation.

I claim:

1. An automobile hinged door comprising a window opening, a window made up of two glass sections mounted in said window opening, a front section and a rear section, the front section being pivotally connected in position so as to act as a wind deflector, the front edge of the front glass being free to move inwardly by moving the front glass about its pivotal connection, the front section and the rear section, when their edges are abutting, forming the window, a movable sealing device for sealing the space between the adjacent edges of the glasses, the glasses being movable relatively when the sealing device is in position, the sealing device being rendered operative by moving the glass sections into substantial alignment in the window opening.

2. An automobile hinged door comprising a window opening, a window made up of two glass sections mounted in said window opening, a front section and a rear section, the front section being pivotally connected in position so as to act as a wind deflector, the front section and the rear section, when their edges are abutting, forming the window, and movable sealing means made effective by the relative movement of the glasses, for sealing the space between the abutting edges of the glasses when they are in position to form the window, said sealing means forming a movable part of the window and completely filling the space between the edges of the glasses when the glasses are in substantial alignment, the glasses being free to move relatively when the sealing device is in position.

3. An automobile hinged door comprising a window opening, a window made up of two glass sections mounted in said window opening, a front section and a rear section, the front section being pivotally connected in position so as to act as a wind deflector, the front section and the rear section, when their edges are abutting forming the window, and means for sealing the space between the abutting edges of the glasses when they are in position to form the window, said sealing means forming a movable part of the window and completely filling the space between the edges of the glasses when the glasses are in substantial alignment, the glasses being free to move relatively when the sealing device is in position, the sealing of the space between the abutting edges of said sections being formed by moving the sections relatively.

4. An automobile hinged door comprising a window opening, a window made up of two glass sections mounted in said window opening, a front section and a rear section, the front section being pivotally connected in position so as to act as a wind deflector, the front section and the hear section, when their edges are abutting, forming the window, and means for sealing the space between the abutting edges of the glasses when they are in position to form the window, said sealing means forming a movable part of the window and completely filling the space between the edges of the glasses when the glasses are in substantial alignment, the glasses being free to move relatively when the sealing device is in position, the relative movement of the sections acting to break the seal between them.

5. An automobile hinged door having a window opening, and comprising a window made up of two glasses, both pivotally connected in the window opening to the car so that they may be moved to angular positions, each of the glasses made up of sheets connected together, one sheet of each glass being of transparent flexible material, the sheets of flexible material positioned so as to be brought into overlapping engagement when the glasses are in closed position with their edge abutting so as to form a water tight joint between the glasses.

6. An automobile hinged door having a window opening, and comprising a window made up of two glasses, both pivotally connected in the window opening to the car so that they may be moved to angular positions, said glasses having transparent portions at their abutting edges projecting beyond the glasses which overlap when they are moved about their pivots to their closed positions, the overlapping portions sealing the space between them, whereby accurate sizing of the glass sections is avoided.

7. A car door having a window opening, and comprising a window made up of two glass sections, a front section and a rear section, the front section being pivotally connected in position by pivots intermediate its front and rear edges so as to act as a wind deflector, the front section and the rear section, when their edges are abutting forming the window and a flexible sealing device between the two glass sections and attached thereto.

WILLARD L. MORRISON.